(12) United States Patent
Womack et al.

(10) Patent No.: US 10,202,014 B2
(45) Date of Patent: Feb. 12, 2019

(54) TWIST BEAM AXLE ASSEMBLY AND METHOD OF MANUFACTURING SAME

(71) Applicants: MAGNA INTERNATIONAL INC., Aurora, ON (CA); Darren Andrew Womack, Windsor (CA); Kevin Richard Langworthy, Davisburg, MI (US)

(72) Inventors: Darren Andrew Womack, Windsor (CA); Kevin Richard Langworthy, Davisburg, MI (US)

(73) Assignee: MAGNA INTERNATIONAL INC., Aurora, Ontario (CA)

( * ) Notice: Subject to any disclaimer, the term of this patent is extended or adjusted under 35 U.S.C. 154(b) by 40 days.

(21) Appl. No.: 15/326,487

(22) PCT Filed: Jul. 15, 2015

(86) PCT No.: PCT/US2015/040465
§ 371 (c)(1),
(2) Date: Jan. 15, 2017

(87) PCT Pub. No.: WO2016/011092
PCT Pub. Date: Jan. 21, 2016

(65) Prior Publication Data
US 2017/0203629 A1 Jul. 20, 2017

Related U.S. Application Data

(60) Provisional application No. 62/026,130, filed on Jul. 18, 2014.

(51) Int. Cl.
*B60G 21/05* (2006.01)
*B60B 35/00* (2006.01)
(Continued)

(52) U.S. Cl.
CPC ............ *B60G 21/052* (2013.01); *B60B 35/00* (2013.01); *B60B 35/004* (2013.01); *B60B 35/02* (2013.01);
(Continued)

(58) Field of Classification Search
CPC ............. B60G 21/052; B60G 2204/41; B60G 2206/73; B60G 2206/20; B60G 2206/82; F16F 1/3732; B60B 35/004; B60B 35/02
See application file for complete search history.

(56) References Cited

U.S. PATENT DOCUMENTS 4,637,628 A 1/1987 Perkins
4,951,962 A * 8/1990 Tomida ................ B60G 21/051
280/124.108

(Continued)

*Primary Examiner* — Darlene P Condra
(74) *Attorney, Agent, or Firm* — Dickinson Wright PLLC

(57) ABSTRACT

A twist axle assembly (20) of a vehicle includes a pair of trailing arms (22) and a twist beam (24) extending along an axis (A) between first and second twist beam ends (26, 28). The twist axle assembly (20) further includes a bushing (38) interconnected to each one of the first and second twist beam ends (26, 28) and a respective trailing arm (22) for establishing a weld-less joint between the twist beam (24) and the trailing arm (24). In an embodiment, the twist beam (24) and bushings (38) are tubular, and the bushings (38) are press-fit or molded onto the respective first or second twist beam ends (36, 38). In a further embodiment, the trailing arms (26) define an orifice (40) aligned on the axis (A), and the tubular bushings (38) are press-fit into the orifices (40) of the trailing arms (26) to establish the weld-less joint.

13 Claims, 6 Drawing Sheets

(51) Int. Cl.
*B60B 35/04* (2006.01)
*B60B 35/08* (2006.01)
*B60B 35/02* (2006.01)
*F16F 1/373* (2006.01)

(52) U.S. Cl.
CPC .............. *B60B 35/04* (2013.01); *B60B 35/08* (2013.01); *B60G 21/051* (2013.01); *F16F 1/3732* (2013.01); *B60B 2900/141* (2013.01); *B60B 2900/321* (2013.01); *B60G 2204/41* (2013.01); *B60G 2206/20* (2013.01); *B60G 2206/73* (2013.01); *B60G 2206/82* (2013.01); *B60Y 2200/14* (2013.01)

(56) References Cited

U.S. PATENT DOCUMENTS

| | | | |
|---|---|---|---|
| 6,086,162 A | 7/2000 | Pinch et al. | |
| 7,360,774 B2 | 4/2008 | Saieg et al. | |
| 7,862,059 B2 | 1/2011 | Ko | |
| 7,967,308 B2 * | 6/2011 | Toepker | B21D 53/88 280/124.106 |
| 2010/0072724 A1 | 3/2010 | Toepker | |
| 2011/0068619 A1 * | 3/2011 | Werner | B22D 19/00 301/127 |
| 2014/0151973 A1 * | 6/2014 | Baumer | B60G 11/189 280/124.128 |

* cited by examiner

TWIST BEAM AXLE ASSEMBLY AND METHOD OF MANUFACTURING SAME

CROSS REFERENCE TO RELATED APPLICATIONS

This U.S. National Stage Patent Application claims the benefit of PCT International Patent Application Serial No. PCT/US2015/040465 filed Jul. 15, 2015 entitled "Twist Beam Axle Assembly And Method Of Manufacturing Same," which claims the benefit of and priority to U.S. Provisional Patent Application Ser. No. 62/026,130 filed Jul. 18, 2014, the entire disclosures of the applications being considered part of the disclosure of this application, and hereby incorporated by reference.

BACKGROUND OF THE INVENTION

1. Field of the Invention

The present invention relates in general to vehicle axles and more particularly to twist beam rear axle assemblies for vehicles. The present invention also relates to a method of manufacturing vehicle axles and more particularly to a method of manufacturing twist beam rear axles assemblies for vehicles.

2. Related Art

A twist beam rear axle suspension assembly, also known as a torsion beam axle, is a type of automobile suspension including a pair of trailing arms, each coupled with a wheel of a vehicle, and a twist beam extending transversely between the trailing arms. During operation of the vehicle, the twist beam deforms in a twisting movement when one of the wheels moves relative to another, for example during roll of the vehicle or when one of the vehicle's wheels encounters, for example, a pothole in the road. The twisting movement of the twist beam absorbs the movement.

Generally, such twist beams are welded directly to each of the trailing arms along multiple areas of the twist beam. For example, when a U-shaped twist beam is interconnected to the trailing arm, a weld is often used to secure the twist beam directly to the trailing arm assembly along a top wall, side walls, and/or a bottom wall of the twist beam. If an O-shaped or C-shaped twist beam is interconnected to the trailing arm, a weld is used to directly secure the twist beam to the trailing arm along a circumference of the twist beam. However, manufacturing variations in the twist beam and/or the trailing arms can lead to challenges and problems when fitting these components together in preparation for the welding operation. In addition, these manufacturing variations can result in an unsatisfactory welded joint between the twist beam and the trailing arms, leading to fatigue and cracking of the welded joint between the twist beam and trailing arms after manufacture and assembly of the twist beam axle assembly.

SUMMARY OF THE INVENTION

One aspect of the present invention includes a twist beam axle assembly of a vehicle which includes a pair of trailing arms and a twist beam extending along an axis A between first and second twist beam ends. The twist axle assembly further includes a pair of bushings each disposed between and interconnected to one of the first or second twist beam ends and a respective trailing arm for establishing a weld-less joint between the twist beam and the trailing arms.

Another aspect of the present invention includes a method of manufacturing a twist beam axle assembly. The method begins by providing a pair of trailing arms, a twist beam extending along an axis A between first and second twist beam ends, and a pair of bushings. The method proceeds by establishing a weld-less connection between each one of the bushings and a respective end of the twist beam, and then establishing a weld-less connection between each of the bushings and a respective trailing arm. As a result, the method of manufacturing the twist beam axle assembly provides for a weld-less joint between the twist beam and the trailing arms.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
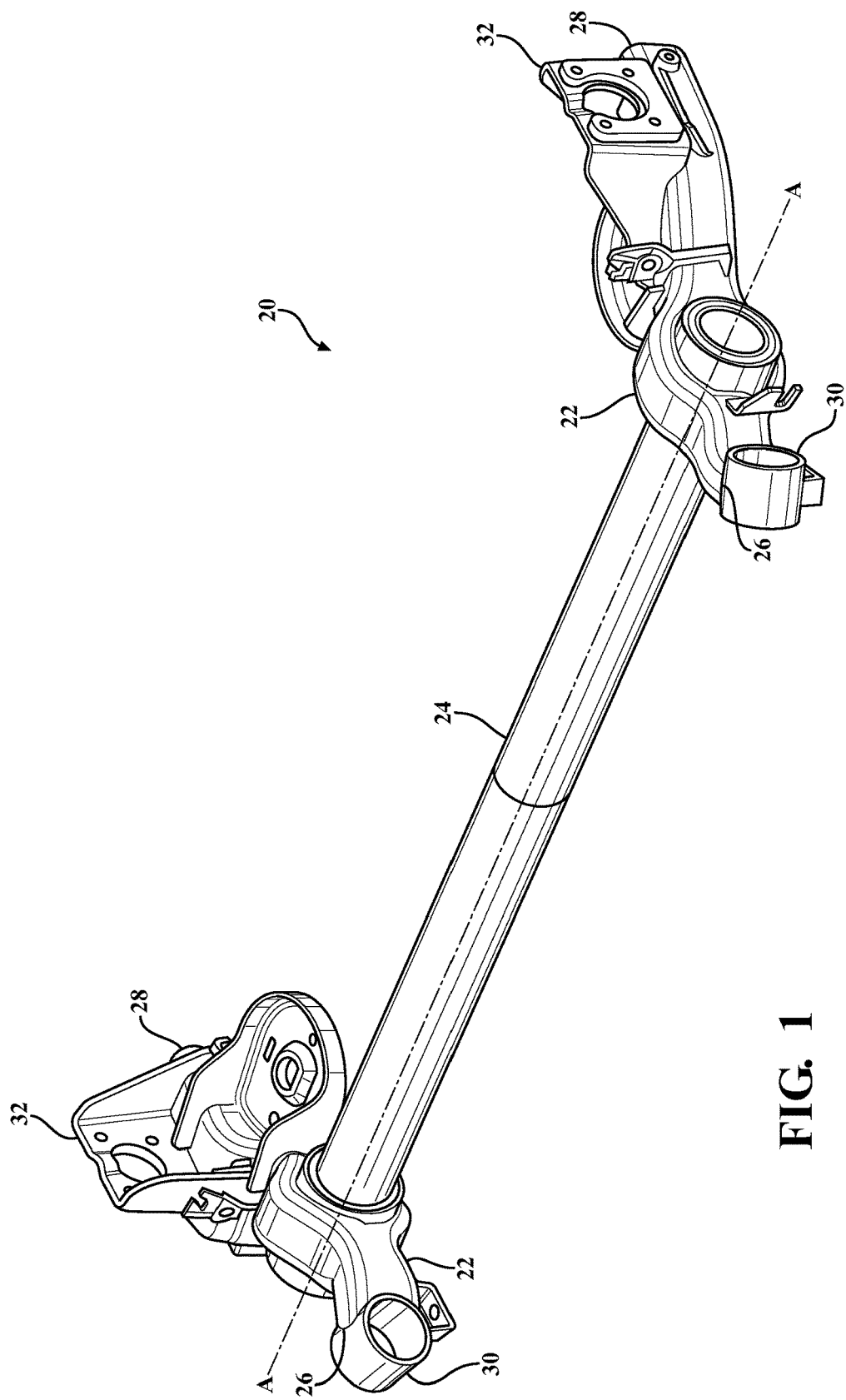
FIG. 1 is a perspective view of a twist beam axle assembly.

Referring to the drawings, wherein like numerals indicate corresponding parts throughout the several views, an exemplary twist beam axle assembly 20 constructed in accordance with an aspect of the present invention is generally shown in FIGS. 1-6. As shown therein, the twist beam axle assembly 20 is a rear suspension assembly and includes a pair of trailing arms 22 attached to opposing ends of a transverse twist beam 24. The trailing arms 22 are formed as separate pieces from the twist beam 24 and, as will be described in more detail below, are subsequently joined or interconnected to the twist beam 24. The trailing arms 22 may be formed in a variety of sizes, shapes, and configurations depending largely upon the vehicle in which the twist beam axle assembly 20 is to be placed.

Figure 2:
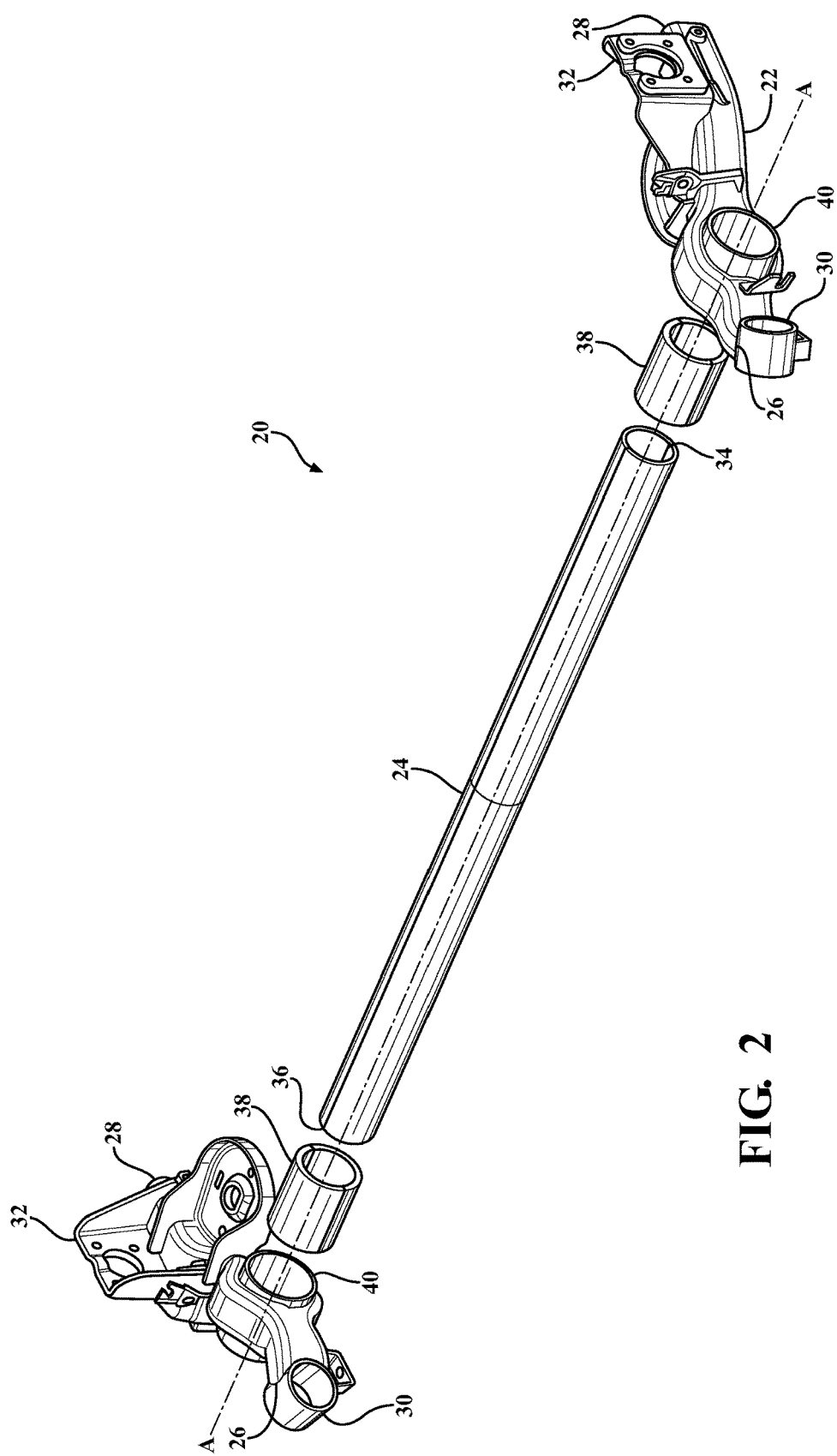
FIG. 2 is an exploded view of FIG. 1 illustrating the twist beam axle assembly.
Figure 3:
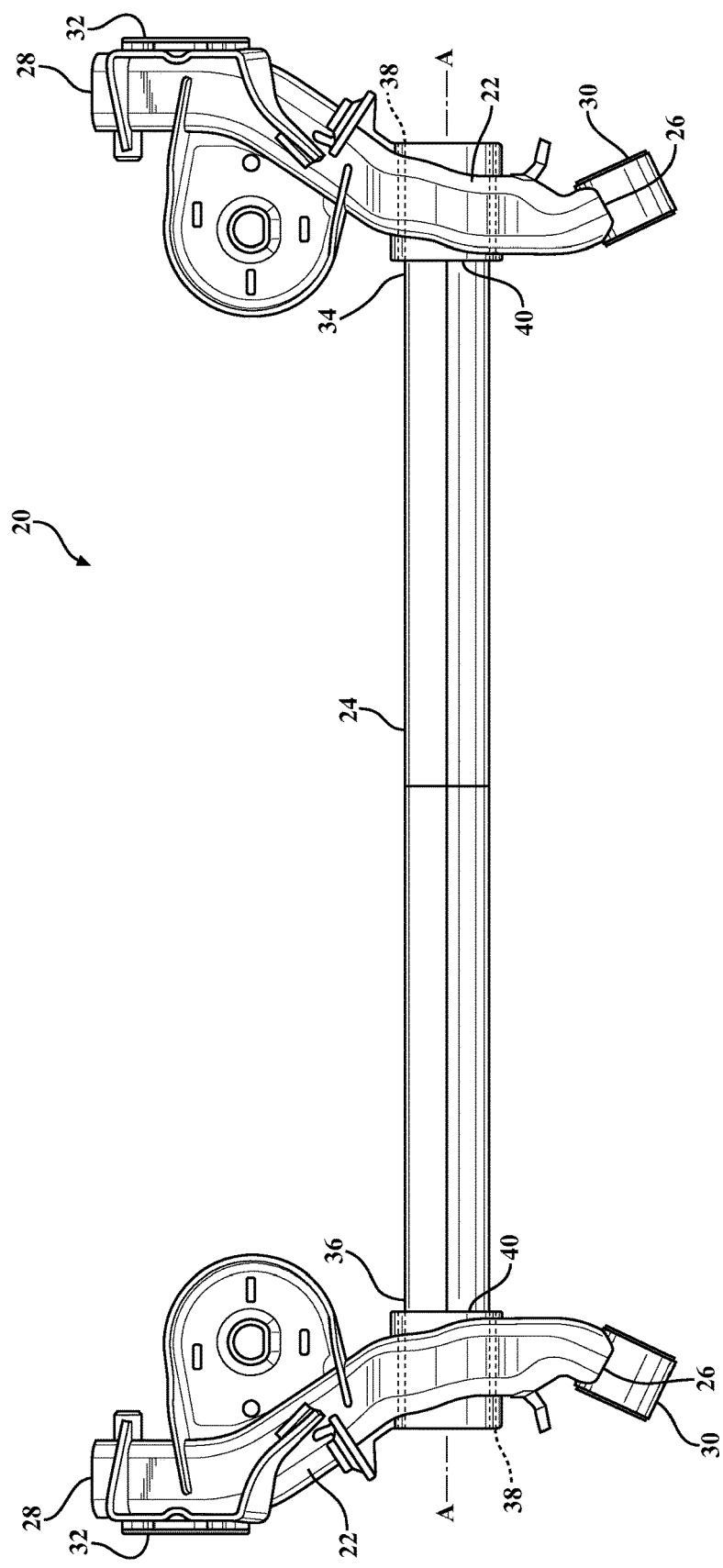
FIG. 3 is a top view of the twist beam axle assembly.
Figure 4:
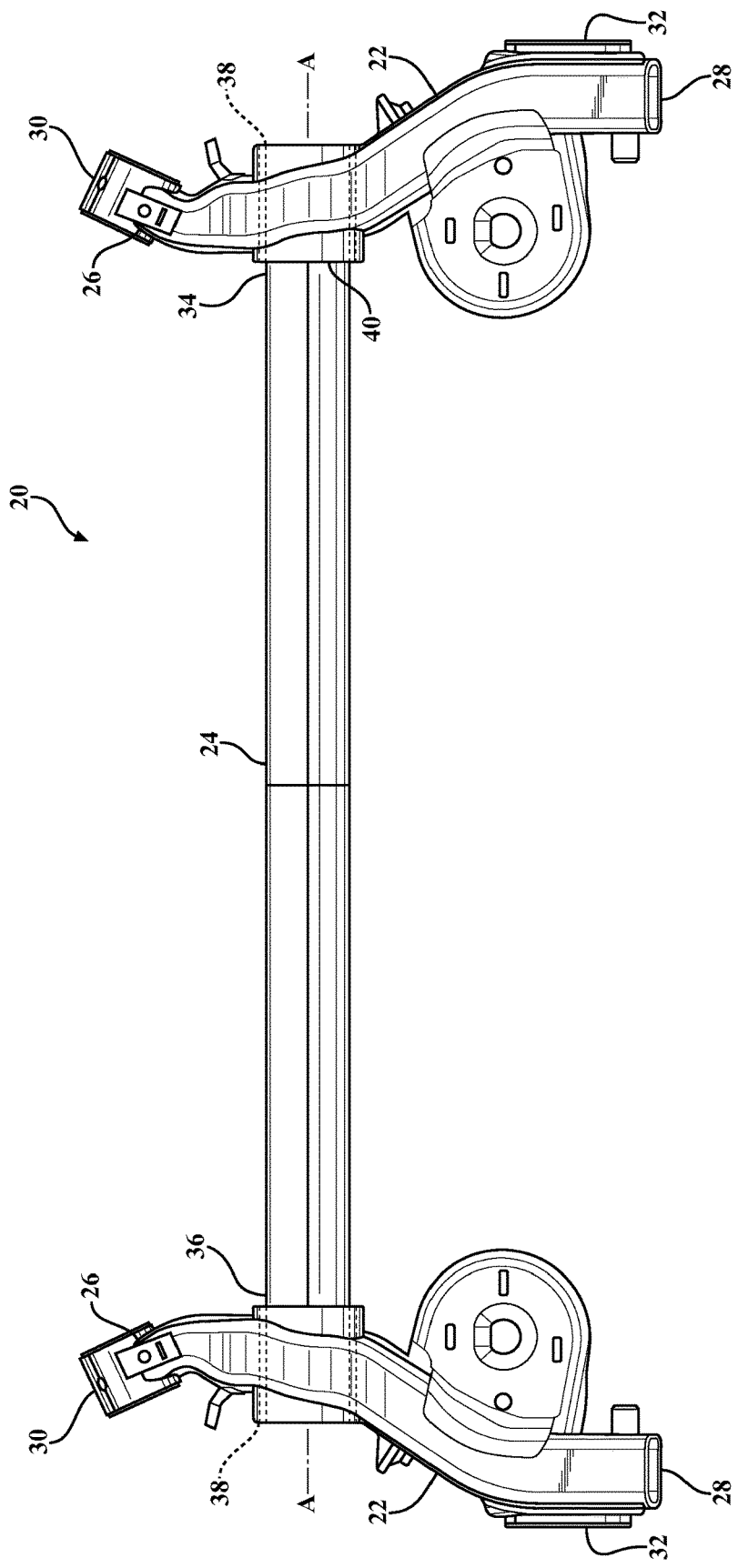
FIG. 4 is a bottom view of the twist beam axle assembly.
Figure 5:
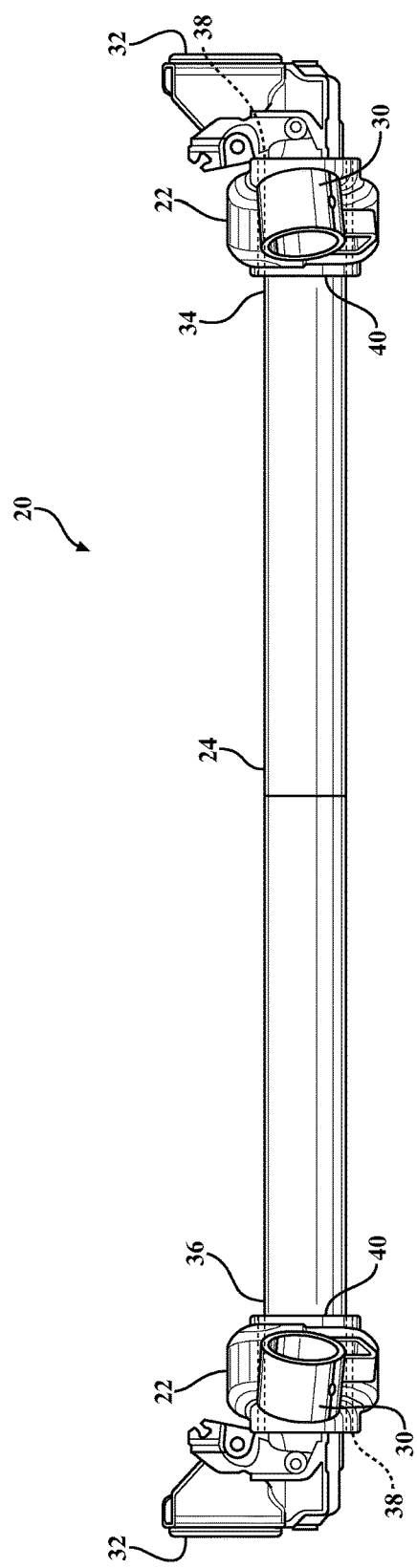
FIG. 5 is a front view of the twist beam axle assembly.
Figure 6:
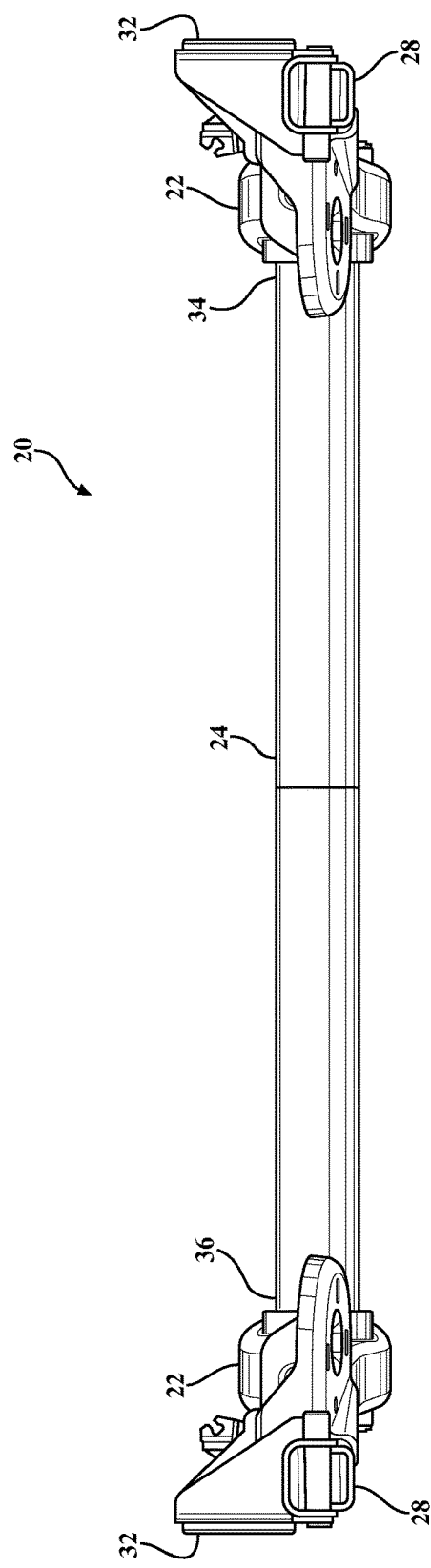
FIG. 6 is a rear view of the twist beam axle assembly.

As shown in FIG. 1, each trailing arm 22 extends between a first trailing arm end 26 and a second trailing arm end 28. An axle mounting member 30 is connected to the first trailing arm ends 26, with each wheel mounting member 30 aligned with one another. A spindle bracket 32 is connected to the trailing arms 22 adjacent the second trailing arm ends 28. As best shown in FIG. 2, the twist beam 22 extends along an axis A from a first twist beam end 34 to a second twist beam end 36. In a preferred arrangement, the twist beam 22 is tubular and formed from a metal tube extending around and longitudinally along the axis A. However, the twist beam 24 can also be comprised of a variety of different shapes, configurations, and materials without departing from the scope of the subject disclosure.

As best shown in FIG. 2, the twist beam axle assembly 20 includes a pair of bushings 38 each individually disposed between and interconnected to the trailing arm 22 and one of the first or second twist beam ends 28, 30 for establishing a weld-less joint between the trailing arms 22 and the twist beam 24. Put another way, the pair of bushings 38 establish the transverse weld-less interconnection between the trailing arm sub-assemblies 22 and the twist beam 22. As a result, the twist beam axle assembly 20 provides for improved and more robust fatigue performance over the prior art twist beam axle assemblies which include welded joints between the trailing arms and twist beam. In an exemplary embodiment, the bushings 38 can be formed from an elastic material, such as rubber or another suitable elastomer, to allow for tuning of the bushing to result in the proper stiffness required for the weld-less interconnection of the trailing arms 22 and the twist beam 24. However, the bushings 38, as this term is used throughout the subject application, can also be solid bushings, plain bearings, ball bearings, roller bearings, needle bearings, or any combination thereof, without departing from the scope of the subject disclosure.

As best shown in FIG. 2, in an exemplary embodiment, each of the bushings 38 are tubular and pressed or molded onto a respective first or second twist beam end 34, 36 of the tubular twist beam 24. However, alternative methods of joining the bushings 38 to the twist beam 24 without the use of a weld are possible without departing from the scope of the subject disclosure. As best shown in FIG. 2, in an exemplary embodiment, each of the trailing arms 22 define an orifice 40 aligned on the axis A and the tubular bushings 38 are pressed into the orifices 40 of the trailing arms 22 to establish the weld-less joint between the trailing arms 22 and the twist beam 24. However, other methods of securing the bushings 38 to the trailing arms 22 without the use of a weld, such as through the use of bolts, or other fasteners, are envisioned without departing from the scope of the subject disclosure.

Another aspect of the present invention includes a method of interconnecting a twist beam 24 and a pair of trailing arms 22 to form a twist beam axle assembly 20. The method begins by providing a pair of trailing arms 22 and a twist beam 24 which extends along an axis A from a first twist beam end 34 to a second twist beam end 36. The method proceeds by providing a pair of bushings 38, and then establishing a weld-less connection between each one of the bushings 38 and a respective end 34, 36 of the twist beam 24. In a preferred embodiment, each of the twist beam 24 and the pair of bushings 38 are tubular, and the aforementioned step includes press-fitting or molding each of the bushings 38 to a respective end 36, 38 of the twist beam 24. The method proceeds by establishing a weld-less connection between the pair of bushings and a respective trailing arm 22. In an exemplary embodiment, the trailing arms 22 define an orifice 40 aligned on the axis A, and the aforementioned step includes press-fitting each of the bushings 38 into a respective orifice 40 of the trailing arm 22. As a result, the method of forming the twist beam axle assembly results in a weld-less joint between the trailing arms 22 and the twist beam 24 that provides for improved and more robust fatigue performance over the prior art twist beam axle assemblies which includes a welded joint.

Obviously, many modifications and variations of the present invention are possible in light of the above teachings and may be practiced otherwise than as specifically described while within the scope of the appended claims.

What is claimed is:

1. A twist axle assembly of a vehicle, comprising:
   a pair of trailing arms;
   a twist beam extending along an axis A between first and second twist beam ends; and
   a bushing disposed between and interconnected via a weld-less connection to each one of said first or second twist beam ends and a respective trailing arm to establish a weld-less joint between said twist beam and said trailing arms.

2. A twist axle assembly as set forth in claim 1, wherein each of said twist beam and said pair of bushings are tubular.

3. A twist axle assembly as set forth in claim 2, wherein each of said pair of bushings are press-fit onto said respective first or second twist beam ends to establish said weld-less connection therebetween.

4. A twist axle assembly as set forth in claim 2, wherein each of said pair of bushings are molded onto said respective first or second twist beam ends to establish said weld-less connection therebetween.

5. A twist axle assembly as set forth in claim 2, wherein each of said trailing arms defines an orifice aligned on said axis A, and wherein said pair of tubular bushings are each press fit into a respective orifice of said trailing arms to establish said weld-less connection therebetween.

6. A twist axle assembly as set forth in claim 2, wherein said twist beam is comprised of a metal tube extending longitudinally around said axis A between said first and second twist beam ends.

7. A twist axle assembly as set forth in claim 1, wherein said pair of bushings are comprised of an elastic material for allowing said pair of bushings to be tuned to provide the proper stiffness requirement for said weld-less joint between said trailing arms and said twist beam.

8. A method of forming a twist axle assembly of a vehicle, comprising:
   providing a pair of trailing arms and a twist beam extending along an axis A between first and second twist beam ends;
   providing a pair of bushings;
   establishing a weld-less connection between each one of the bushings and one of the first or second twist beam ends of the twist beam; and
   establishing a weld-less connection between each of the pair of bushings and a respective trailing arm to establish a weld-less joint between the trailing arms and the twist beam.

9. A method as set forth in claim 8, wherein each of the twist beam and the pair of bushings are tubular, and said step of establishing a weld-less connection between the bushings and the twist beam further includes press-fitting the bushings onto a respective end of the twist beam.

10. A method as set forth in claim 8, wherein each of the twist beam and the pair of bushings are tubular, and said step of establishing a weld-less connection between the bushings and the twist beam further includes molding the bushings onto a respective end of the twist beam.

11. A method as set forth in claim 8, wherein the trailing arms each define an orifice aligned on the axis A, and said step of establishing a weld-less connection between the bushings and the trailing arms includes press-fitting each of the bushings into a respective orifice of the trailing arm.

12. A method as set forth in claim 8, wherein said step of establishing a weld-less connection between the bushings and the twist beam further includes bolting each of the bushings onto the respective trailing arm.

13. A method as set forth in claim 8, where said step of providing the pair of bushings includes providing a pair of bushings comprised of an elastic material.

* * * * *